June 30, 1970  O. HAGE  3,517,944
HYDRAULIC MECHANISM FOR RAISING AND LOWERING FLAT BED TRAILERS
Filed June 3, 1968  2 Sheets-Sheet 1
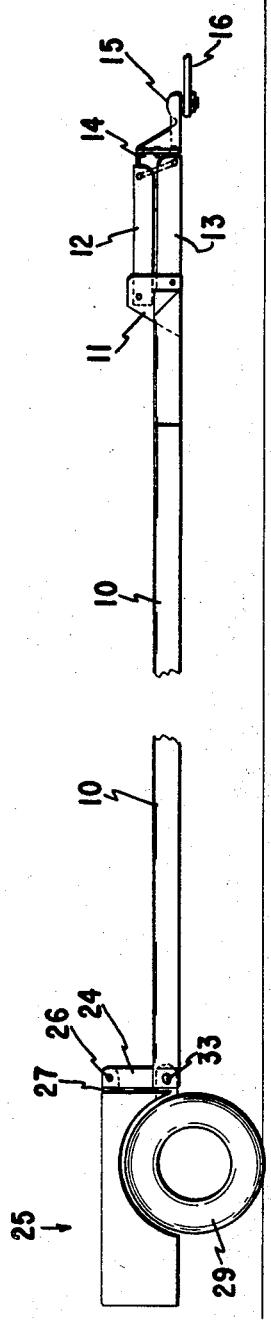
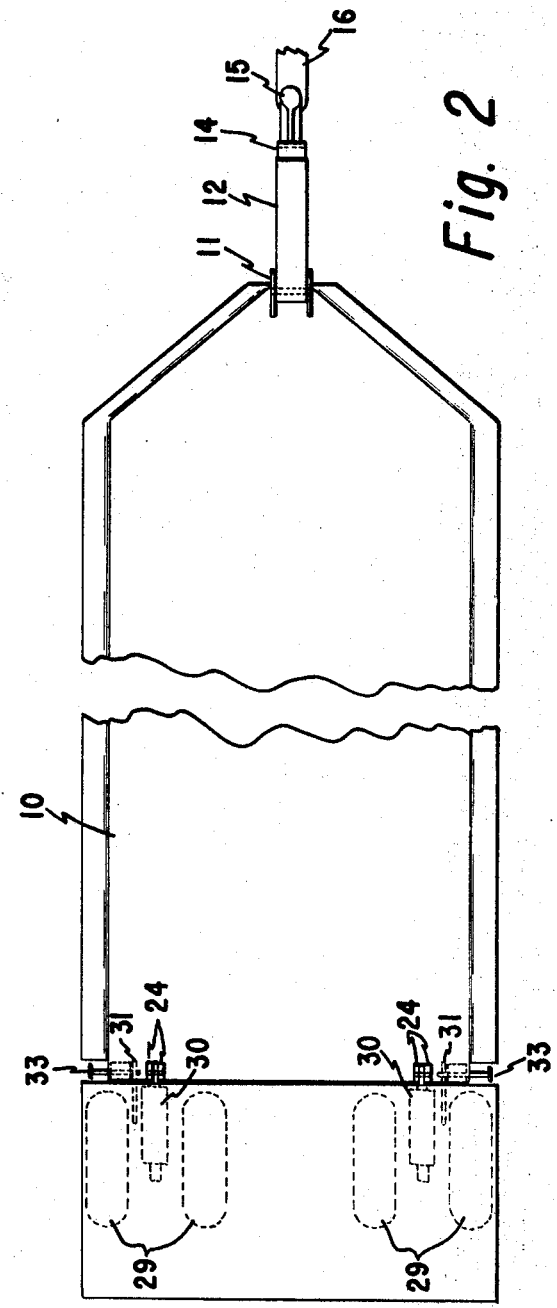
Otto Hage
INVENTOR.
BY Lucas J. DeKoster
His Att'y.

June 30, 1970   O. HAGE   3,517,944
HYDRAULIC MECHANISM FOR RAISING AND LOWERING FLAT BED TRAILERS
Filed June 3, 1968   2 Sheets-Sheet 2

Otto Hage
INVENTOR.

BY
His Att'y.

United States Patent Office 3,517,944
Patented June 30, 1970

3,517,944
HYDRAULIC MECHANISM FOR RAISING AND LOWERING FLAT BED TRAILERS
Otto Hage, 2704 Wood Drive,
Sioux Falls, S. Dak. 57105
Filed June 3, 1968, Ser. No. 733,972
Int. Cl. B60d 1/00
U.S. Cl. 280—414.5      1 Claim

ABSTRACT OF THE DISCLOSURE

A trailer for carrying road machinery or the like which is hinged to a dolly at one end and to the tongue at the other end so that the trailer bed can be dropped to a position lying on the ground. In this position the machine to be carried can be driven onto the trailer bed, then raised into a carrying position by hydraulic means.

---

This invention pertains to trailers and more particularly to a class of trailers used for carrying road and construction machinery and commonly referred to as "low boy" trailers.

Most trailers of this type are built with an offset axle so that the bed of the trailer is underslung—either at about axle level or below. In order to load the piece of machinery onto such a trailer, it is necessary to use planks to build a run-way up to the side of the trailer.

By my invention, I provide a trailer in which the entire trailer bed can be lowered onto the ground. In this position, the machine to be carried can be driven right up onto the platform in most cases since the thickness of the platform will cause a step of the order of four to six inches which is negotiable by most pieces of equipment. The mechanism to accomplish the lowering and subsequent raising of the platform is compact and so located that there is no less space on the platform than for the ordinary lowboy trailer.

A more complete understanding of my invention and its embodiment may be had from a study of the following specification and the figures in which:

FIG. 1 is a side elevational view of my trailer in its normal travel or raised position.

FIG. 2 is a top plan view of the trailer.

Figure 3:
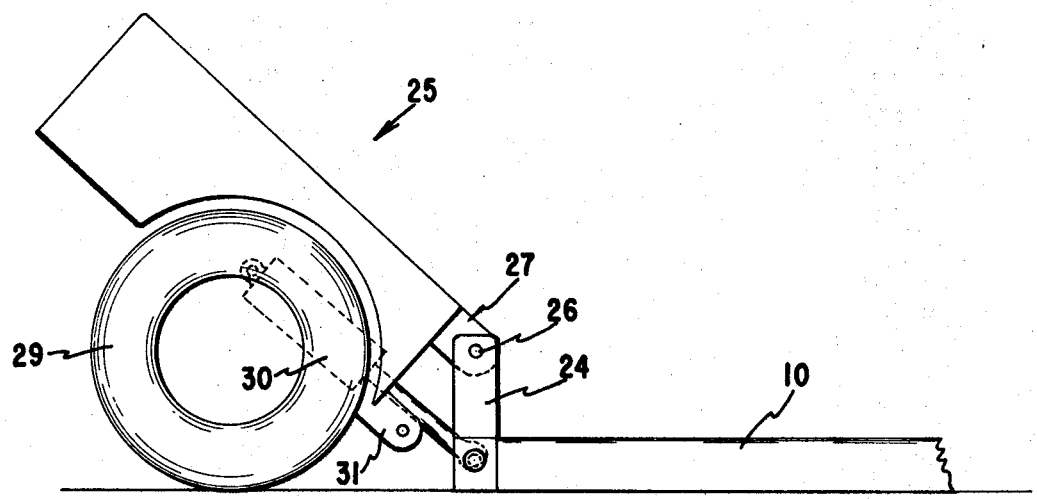
FIG. 3 is an elevational view to an enlarged scale of the rear dolly showing the trailer bed in a lowered position.

Briefly my invention comprises a trailer having a tongue end and a wheeled end. Both ends are hinged to the bed of the trailer so that the bed can be raised to a normal carrying position or lowered to a lower or loading position. Hydraulic means within the tongue at the tongue end and the dolly at the wheeled end provide the means whereby the bed can be raised and lowered.

More specifically, and with reference to the figures, my invention includes a bed 10 which provides the platform on which the machine or other device is to be carried. At the forward end of the bed I provide an upstanding bracket 11 on which the tongue is mounted.

The tongue itself is composed of a parallelogram mechanism including the front bracket 11 to which is pivotally mounted an upper arm 12 and a lower arm 13. The tongue piece 14 completes the parallelogram. In order to provide for easy connection of the trailer to a towing vehicle, I prefer to use a ball joint. Therefore, I have illustrated my trailer as carrying a socket 15 fixed to the tongue piece 14. This is adapted to be connected to a ball on the drawbar 16 of a truck or the like.

Figure 4:
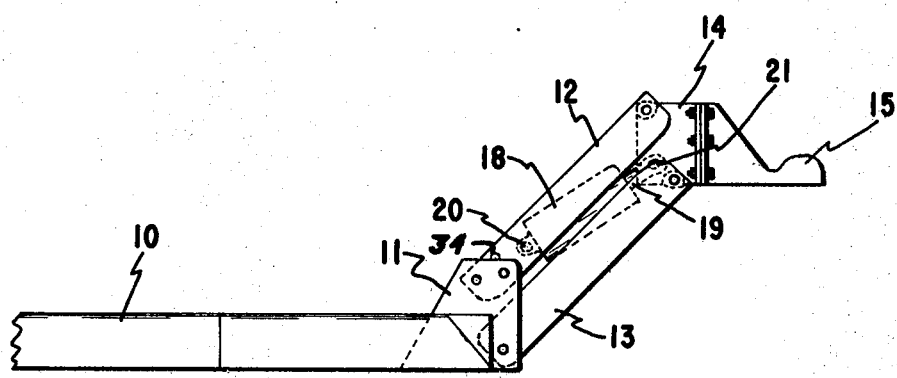
FIG. 4 is a view similar to FIG. 3 of the tongue end of the trailer.

Between the upper arm 12 and the lower arm 13 of the parallelogram mechanism. I provide a hydraulic cylinder 18 and piston 19 assembly. One end of the assembly is pivotally connected to the upper arm 12 as at 20, and the other end to the lower arm 13 or to the tongue piece 14 at a lower position 21. Thus, this assembly forms a diagonal or nearly a diagonal of the parallelogram. It will now be obvious that extension of the assembly by forcing the piston outwardly of the cylinder will tend to move the parallelogram figure to the position shown in FIG. 1 whereas retraction of the piston will allow the parallelogram to assume the position shown in FIG. 4.

At the end of the bed 10 opposite the tongue assembly, I provide a pair of upstanding hinge brackets 24. These brackets are a permanent part of the center portion or bed of the trailer and with the front bracket 11 form the only obstructions on the bed. A wheeled dolly assembly 25 is pivotally connected to the brackets 24 by means of a pin 26 extending through each of the brackets 24 and each of a pair of ears 27 on the dolly.

The dolly itself includes a framework on which are mounted the usual wheels 29 in a manner well known in the art. This would include the usual axles, springs etc. As best shown in FIG. 3, a hydraulic piston and cylinder assembly 30 or a pair of assemblies is mounted between the dolly 25 and the bed 10 of the trailer. Again, the action is obvious. When the piston is forcibly retracted, the dolly is pulled toward the trailer bed, and the bed rises because of the pivotal movement about the pins 26. When the pressure on the cylinder is relaxed, the bed is lowered by the reverse action.

In order to hold the bed 10 in its upper or carrying position, I provide for a positive lock of both the dolly and the tongue in that position. In the case of the tongue, I simply provide for holes 34 (FIG. 4) in the lower arm 13 and in the bracket 11 which are aligned in the upper position. A pin can then be inserted through the holes to hold the parallelogram mechanism in a fixed position.

Figure 5:
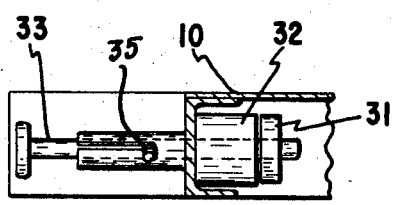
FIG. 5 is a detailed view to an enlarged scale of the mounting of the holding pin for the dolly.

In the case of the dolly, I provide a mounted pin as best shown in FIG. 5. On the bed 10 of the trailer, I mount a support 32 which is generally tubular in shape. The pin 33 is slidably mounted in the support and may be provided with a detent mechanism 35 as illustrated. The pin therefore will extend through the opening in the ears 31 which are a part of the dolly, and thereby hold the dolly and trailer bed in the raised or travel position. Withdrawal of the pin will allow the bed to be dropped, and may be facilitated at first by actuating the piston and cylinder mechanism 30 to support the load while the pin is being withdrawn.

Having thus described my invention in its embodiment, I am aware that numerous and extensive departures may be made therefrom without departing from the spirit and scope of the invention as limited only by the following claim.

I claim:

1. A trailer comprising a bed, tongue means movably mounted on said bed, power operated means engaged between said tongue means and said bed, upstanding hinge brackets on said bed, dolly means hinged to said bed at a pivot line near the upper part of said brackets, second power operated means connected to said dolly comprising at least one piston and cylinder assembly within the dolly and connected to said bed at a point substantially below said pivot line, ears on said dolly means extending toward said bed substantially below said pivot line, pin means mounted on said bed engageable with said ears to hold said bed in a raised position, said pin means being releasable from said ears to allow pivotal motion between said bed and said dolly whereby said bed is dropped to a lower position.

References Cited
UNITED STATES PATENTS

| | | | |
|---|---|---|---|
| 2,653,827 | 9/1953 | Manning. | |
| 2,806,710 | 9/1957 | Mascaro | 280—414.5 |
| 2,858,950 | 11/1958 | Martin | 214—505 |
| 2,922,534 | 1/1960 | Vodraska | 214—75 |
| 3,232,464 | 2/1966 | Bogh et al. | 214—512 |
| 3,346,131 | 10/1967 | Lundell | 214—512 |

LEO FRIAGLIA, Primary Examiner

U.S. Cl. X.R.

214—512; 280—43.23